(12) United States Patent
Wisniewski

(10) Patent No.: US 12,189,528 B2
(45) Date of Patent: Jan. 7, 2025

(54) BIOMETRIC CACHING

(71) Applicant: Alclear, LLC, New York, NY (US)

(72) Inventor: Rob Wisniewski, Jersey City, NJ (US)

(73) Assignee: SECURE IDENTITY, LLC, New York, NY (US)

( * ) Notice: Subject to any disclaimer, the term of this patent is extended or adjusted under 35 U.S.C. 154(b) by 233 days.

(21) Appl. No.: 17/524,842

(22) Filed: Nov. 12, 2021

(65) Prior Publication Data

US 2023/0153242 A1    May 18, 2023

(51) Int. Cl.
    *G06F 21/00*      (2013.01)
    *G06F 12/0802*      (2016.01)
    *G06F 21/32*      (2013.01)
    *G06V 40/16*      (2022.01)

(52) U.S. Cl.
CPC .......... *G06F 12/0802* (2013.01); *G06F 21/32* (2013.01); *G06V 40/172* (2022.01); *G06F 2212/60* (2013.01)

(58) Field of Classification Search
CPC .. G06F 12/0802; G06F 21/32; G06F 2212/60; G06V 40/172; G06V 10/95; G06V 40/50; G07C 9/37; H04L 63/0861; H04W 12/06
See application file for complete search history.

(56) References Cited

U.S. PATENT DOCUMENTS

| | | | |
|---|---|---|---|
| 8,381,969 B1 | 2/2013 | Miller et al. | |
| 8,423,462 B1 | 4/2013 | Amacker et al. | |
| 8,458,779 B2 | 6/2013 | Valentine et al. | |
| 8,521,131 B1 | 8/2013 | Ramalingam et al. | |
| 8,744,966 B1 | 6/2014 | Amacker et al. | |
| 8,782,758 B2 | 7/2014 | Kamakura | |
| 8,965,170 B1 | 2/2015 | Benea | |
| 9,107,064 B1 | 8/2015 | Ramalingam et al. | |
| 9,166,961 B1 | 10/2015 | Johansson et al. | |
| 9,202,105 B1 | 12/2015 | Wang et al. | |
| 9,324,098 B1 | 4/2016 | Agrawal et al. | |
| 9,386,507 B1 | 7/2016 | Ramalingam et al. | |
| 9,607,138 B1 | 3/2017 | Baldwin et al. | |
| 9,609,577 B1 | 3/2017 | Ramalingam et al. | |
| 9,681,350 B1 | 6/2017 | Marupaduga et al. | |
| 9,681,359 B2 | 6/2017 | Ramalingam et al. | |
| 9,723,131 B1 | 8/2017 | Ramalingam et al. | |

(Continued)

*Primary Examiner* — William A Corum, Jr.
(74) *Attorney, Agent, or Firm* — Brownstein Hyatt Farber Schreck, LLP

(57) ABSTRACT

An identification station is operable to obtain digital representations of biometrics for people and communicate these digital representations of biometrics over one or more networks to an identification system device in order to identify the people for a variety of different purposes. The identification station also stores data related to previous biometric identifications in a local cache for one or more time windows. Upon obtaining a digital representation of a biometric, the identification station may first check if the digital representation of the biometric corresponds to data in the local cache. If so, the identification station may omit communicating with the identification system device. Otherwise, the identification station may communicate with the identification system device to identify the person, as well as store the digital representation of the biometric in the local cache for the one or more time windows.

20 Claims, 10 Drawing Sheets

(56) References Cited

U.S. PATENT DOCUMENTS

| | | |
|---|---|---|
| 9,836,642 B1 | 12/2017 | Ramaswamy |
| 9,934,504 B2 | 4/2018 | Wang et al. |
| 9,967,250 B2 | 5/2018 | Johansson et al. |
| 10,027,662 B1 | 7/2018 | Mutagi et al. |
| 10,055,740 B2 | 8/2018 | Hanson et al. |
| 10,104,181 B1 | 10/2018 | Rao et al. |
| 10,108,791 B1 | 10/2018 | Masterman |
| 10,108,961 B2 | 10/2018 | Wang et al. |
| 10,122,727 B2 | 11/2018 | Johansson et al. |
| 10,235,669 B2 | 3/2019 | Amacker et al. |
| 10,242,364 B2 | 3/2019 | Wang et al. |
| 10,243,945 B1 | 3/2019 | Kruse et al. |
| 11,151,481 B1 | 10/2021 | Sun et al. |
| 2004/0221303 A1 | 11/2004 | Sie |
| 2013/0218956 A1* | 8/2013 | Zheng ............... H04L 67/1095 |
| | | 709/203 |
| 2014/0189720 A1 | 7/2014 | Terrazas |
| 2015/0294515 A1 | 10/2015 | Bergdale |
| 2016/0189063 A1 | 6/2016 | Nie |
| 2016/0350334 A1* | 12/2016 | Bataller ............... G06V 10/771 |
| 2017/0188103 A1 | 6/2017 | Pan |
| 2017/0206345 A1 | 7/2017 | LaCous et al. |
| 2017/0308694 A1* | 10/2017 | Belavadi ................ G06F 21/45 |
| 2018/0007060 A1 | 1/2018 | Leblang et al. |
| 2019/0036939 A1 | 1/2019 | Johansson et al. |
| 2019/0050631 A1 | 2/2019 | Hayase |
| 2020/0211312 A1* | 7/2020 | Wisniewski ......... G06Q 20/363 |
| 2020/0213301 A1* | 7/2020 | Wisniewski ............. G07C 9/37 |
| 2020/0380026 A1 | 12/2020 | Bataller et al. |

* cited by examiner

BIOMETRIC CACHING

FIELD

The described embodiments relate generally to biometric identification. More particularly, the present embodiments relate to caching of biometric data used in biometric identification.

BACKGROUND

Biometric identification systems may identify people using biometrics. Biometrics may include fingerprints, irises, eyes, faces, voices, gaits, pictures, or other identifying characteristics about a person. A biometric identification system may capture a biometric using a biometric reader and identify a person by comparing the captured information against stored information. For example, an electronic device may capture an image of a fingerprint using a fingerprint reader device and compare the image of the fingerprint against stored fingerprint images. By way of another example, an electronic device may capture an image of a face using a camera and compare the image of the face against stored facial images.

Biometrics may be actively and/or passively obtained using various biometric readers. Active biometrics may involve a person from whom the biometrics are obtained participating in capture of the biometrics. By way of example of active biometric capture, a person may intentionally provide one or more fingerprints, palm prints, vein scans, and so on to one or more biometric reader devices. By way of contrast, passive biometrics may be able to be captured without requiring the participation of the person from whom the biometrics are obtained. By way of a first example of passive biometric capture, one or more cameras may capture one or more images of a person's iris, retina, face, gait, and so on. By way of another example, one or more microphones may record the person's voice.

SUMMARY

The present disclosure relates to a biometric caching system. An identification station stores data related to previous biometric identifications in a local cache for one or more time windows. Upon obtaining a digital representation of a biometric, the identification station may first check if the digital representation of the biometric corresponds to data in the local cache. If so, the identification station may omit communicating with the identification system device. Otherwise, the identification station may communicate with the identification system device to identify the person, as well as store the digital representation of the biometric in the local cache for the one or more time windows.

In various embodiments, an identification station that performs biometric caching includes a non-transitory storage medium storing instructions and a processor. The processor executes the instructions to obtain a digital representation of a biometric for a person, compare the digital representation of the biometric to data in a local cache, and, in response to determining that the digital representation of the biometric does not correspond to the data in the local cache communicate the digital representation of the biometric to an identification system device to identify the person, the identification system device storing biometric data and associated identity information for multiple people, and store the digital representation of the biometric in the data in the local cache for a time window.

In some examples, the processor removes the digital representation of the biometric from the data in the local cache after the time window. In a number of examples, the identification station further includes a biometric reader device that passively captures the digital representation of the biometric. In various examples, the biometric includes at least a portion of a face. In some examples, the processor omits identifying the person in response to determining that the digital representation of the biometric corresponds to the data in the local cache. In some examples, the processor stores respective identity information associated with the person in association with the digital representation of the biometric in the data in the local cache. In a number of examples, the processor stores an indication of the time window in association with the digital representation of the biometric in the data in the local cache.

In some embodiments, an identification station that performs biometric caching includes a non-transitory storage medium storing instructions and a processor. The processor executes the instructions to obtain a digital representation of a biometric for a person and, in response to determining that the digital representation of the biometric does not correspond to data in a local cache use the digital representation of the biometric and an identification system device that stores biometric data and associated identity information for multiple people to identify the person, determine a time window, and store the digital representation of the biometric in the data in the local cache for the time window.

In various examples, the digital representation of the biometric is a first digital representation of the biometric and the processor extends the time window in response to determining that a second digital representation of the biometric is received that corresponds to the first digital representation of the biometric and the data in the local cache. In some examples, the identification station determines the time window according to an availability of the identification system device. In a number of examples, the processor determines the time window using respective identity information associated with the person. In various examples, the processor determines the time window according to a context of the identification station. In a number of examples, the processor determines the time window according to a context of identifying the person. In some examples, the processor determines the time window based on a schedule entry associated with the person.

In a number of embodiments, a system for biometric caching includes an identification system device and an identification station. The identification station obtains a digital representation of a biometric for a person and, in response to determining that the digital representation of the biometric does not correspond to data in a local cache, transmits the digital representation of the biometric to the identification system device that stores biometric data and associated identity information for multiple people, receives an identification from the identification system device, receives an indication of a time window from the identification system device, and stores the digital representation of the biometric in the data in the local cache for the time window.

In various examples, the identification system device determines the time window using respective identity information associated with the person. In some examples, the identification system device determines the time window according to a context of the identification station. In a number of examples, the identification system device determines the time window according to a context of the identification. In some examples, the identification system device determines the time window is a first time window when the person is a first person and a second time window when the person is a second person. In various examples, the local cache indefinitely stores digital representations of biometrics for a set of people.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
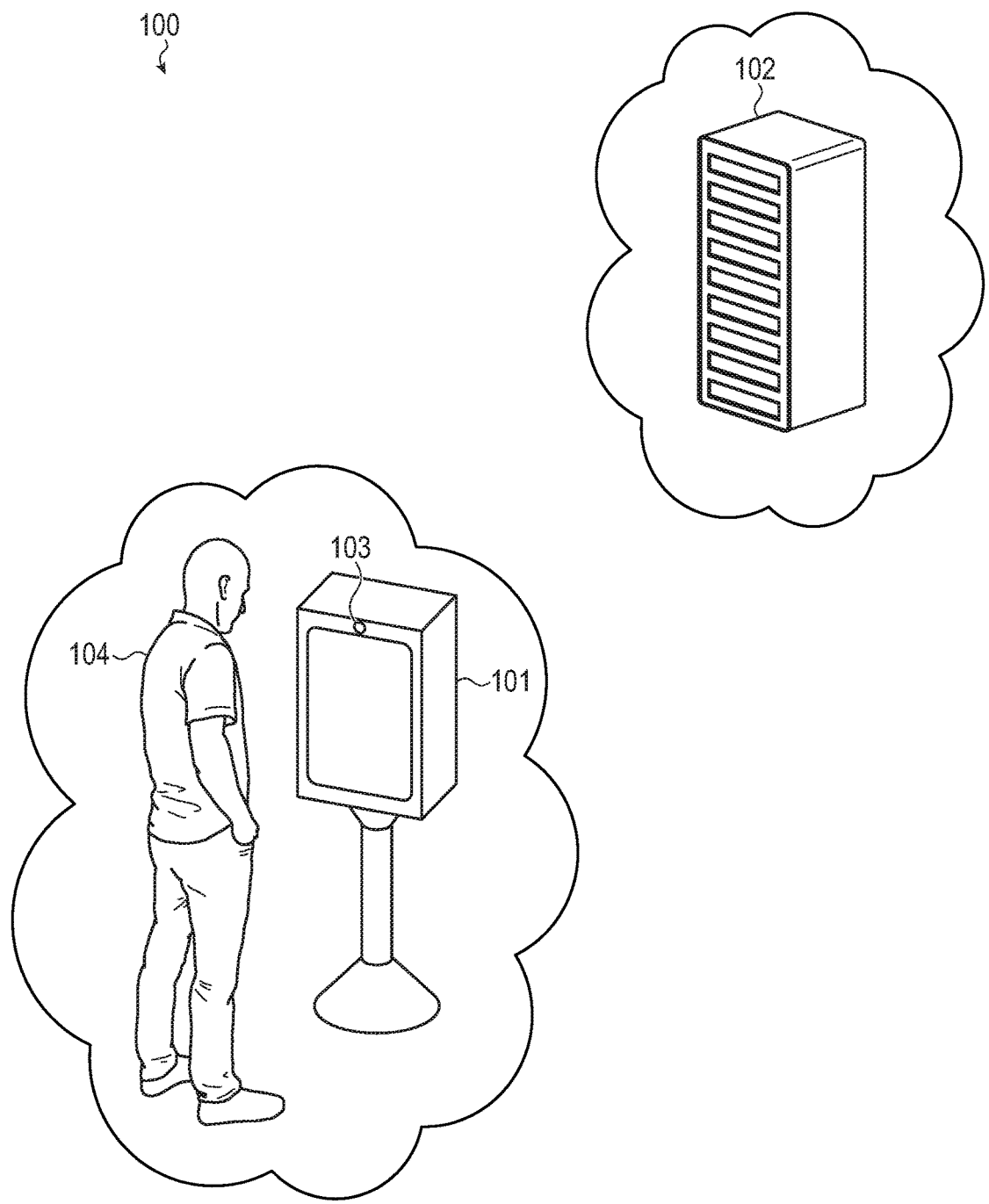
FIG. 1 depicts an example biometric caching system.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, apparatuses, methods, and computer program products that embody various elements of the present disclosure. However, it should be understood that the described disclosure may be practiced in a variety of forms in addition to those described herein.

One or more identification stations may obtain digital representations of biometrics for people and communicate these digital representations of biometrics over one or more networks to one or more identification system devices in order to identify the people for a variety of different purposes. The identification system device may compare the digital representations of biometrics to stored biometric data and associated identity information for multiple people to perform identifications and/or provide various information to the identification stations regarding such.

An identification station may obtain one or more digital representations of biometrics from the same person repeatedly. This may particularly be the case with passively obtained biometrics. For example, an identification station in a waiting room may capture facial images of anyone within view of a camera in order to check people in for appointments. As people waiting for appointments may continue to wait in the waiting room for a long period of time, the identification station may repeatedly communicate with an identification system device to identify a person continuing to wait in the waiting room even though the person has already been identified (and/or one or more actions performed based on such an identification). This may result in unnecessary network traffic, identification system device load, reduced system response times, and/or otherwise result in impaired system performance.

The present disclosure relates to a biometric caching system. An identification station stores data related to previous biometric identifications in a local cache for one or more time windows. Upon obtaining a digital representation of a biometric, the identification station may first check if the digital representation of the biometric corresponds to data in the local cache. If so, the identification station may omit communicating with the identification system device. Otherwise, the identification station may communicate with the identification system device to identify the person, as well as store the digital representation of the biometric in the local cache for the one or more time windows.

In this way, network traffic between the identification station and the identification system device and/or identification system device load may be significantly reduced, enabling use of networks and/or identification system devices with fewer hardware and/or software resources. Further, system response times may be significantly improved. Additionally, this may allow performance of functions that were previously not performable and enable more efficient processing while expending less work, eliminating unnecessary hardware and/or other components, and more efficiently using hardware, software, network, and/or other resources. This may improve the operation of systems involved by reducing unnecessary components, increasing the speed at which the systems perform operations, and/or reducing consumption of hardware, software, network, and/or other resources.

These and other embodiments are discussed below with reference to FIGS. 1-10. However, those skilled in the art will readily appreciate that the detailed description given herein with respect to these Figures is for explanatory purposes only and should not be construed as limiting.

FIG. 1 depicts an example biometric caching system 100. The system 100 may include one or more identification stations 101 that are communicably connected to one or more identification system devices 102. The identification station 101 may passively and/or actively obtain one or more digital representations of biometrics for one or more people 104 using one or more biometric reader devices 103 and communicate these digital representations of biometrics to the identification system device 102 in order to identify the people for a variety of different purposes. The identification system device 102 may compare the digital representations of biometrics to stored biometric data and associated identity information for multiple people to perform identifications and/or provide various information to the identification station 101 regarding such.

The identification station 101 may store data related to previous biometric identifications in a local cache for one or more time windows. Upon obtaining a digital representation of a biometric, the identification station 101 may first check if the digital representation of the biometric corresponds to data in the local cache. If so, the identification station 101 may omit communicating with the identification system device 102. Otherwise, the identification station 101 may communicate with the identification system device 102 to identify the person 104, as well as store the digital representation of the biometric in the local cache for the one or more time windows.

In this way, network traffic between the identification station 101 and the identification system device 102 and/or identification system device 102 load may be significantly reduced, enabling use of networks and/or identification system devices 102 with fewer hardware and/or software resources. Further, system response times may be significantly improved. Additionally, this may allow performance of functions that were previously not performable and enable more efficient processing while expending less work, eliminating unnecessary hardware and/or other components, and more efficiently using hardware, software, network, and/or other resources. This may improve the operation of systems involved by reducing unnecessary components, increasing the speed at which the systems perform operations, and/or reducing consumption of hardware, software, network, and/or other resources.

The identification station 101 may identify people (whether using the digital representation of the biometric and the identification system device 102 or not) for a variety of different purposes. For example, in some examples, the purpose may be for determining whether or not the person is known, such as in situations where known people may be provided access to a reduced security screening procedure while unknown people may instead access a full security screening procedure. In other examples, the purpose may be for determining access permissions that are associated with a particular person. In still other examples, the purpose may be for facilitating payment, such as where identity information is accessed that includes financial account information that may be used to process payment. In yet other examples, the purpose may be for limiting access according to information about a person, such as limiting sales of certain items to people with particular verified ages.

In various examples, the identification station 101 may treat a person as identified when the digital representation of the biometric corresponds to the data in the local cache. In some such examples, the identification station 101 may be attempting to determine whether or not the person can be identified. As correspondence between the digital representation of the biometric and the data in the local cache means that the person has previously been identified, the identification station 101 may take this as proof of identification. In other such examples, the identification station 101 may be attempting to access identity information for the person. In such examples, the data in the local cache may include and/or otherwise be associated with the identity information (which may have been obtained from the identification system device 102 as part of a previous identification) and the identification station 101 may access such identity information using the local cache without again having to communicate with the identification system device 102. In other examples, it may be determined not to attempt to identify a person when the digital representation of the biometric corresponds to the data in the local cache. For example, the identification station 101 may identify people as part of checking the people in for appointments. Correspondence between the digital representation of the biometric and the data in the local cache means that the person has already been checked in and does not need to be identified again. Various configurations are possible and contemplated without departing from the scope of the present disclosure.

In a number of implementations, the identification station 101 may extend the time window for data stored in the local cache upon determining that a digital representation of a biometric corresponds to the data stored in the local cache. Repeated obtaining of digital representations of biometrics for the same person may indicate an increased likelihood that digital representations of biometrics for that person will be received again within a short period of time. As such, extending the time window may prevent an unnecessary repetition of communicating with the identification system device 102 to identify the person that might occur if the original time window passed. Various configurations are possible and contemplated without departing from the scope of the present disclosure.

In various implementations, the local cache may indefinitely store data, such as digital representations of biometrics, for a set of people. By way of illustration, staff at a location where people are checked in for appointments using the identification station 101 may not even need to be identified. However, the staff may continually be present, risking unnecessary performance of identifications if data, such as digital representations of biometrics, for the staff is not stored in the local cache. As such, the data, such as digital representations of biometrics, for the staff may be stored in the local cache without any time window limitation. Various configurations are possible and contemplated without departing from the scope of the present disclosure.

In some implementations, the identification station 101 may use set time windows (such as ten minutes, one hour, one day, one month, and so on) for storing digital representations of biometrics and/or other information in the data in the local cache. In other implementations, the identification station 101 may determine and/or define a time window for storing a digital representation of a biometric and/or other information in the data in the local cache. The identification station 101 may determine the time window using identity information (which may be obtained from the identification system device 102 as part of communicating with the identification system device 102) for the person 104, a context of the identification station 101, a context of identifying the person 104, a schedule entry associated with the person 104, availability of the identification system device 102, and so on. Various configurations are possible and contemplated without departing from the scope of the present disclosure.

By way of a first example, the identification station 101 may be a biometric check in device for a medical service provider location. As part of communicating with the identification system device 102, the identification station 101 may receive identity information for the person. The identity information for the person may indicate that the person is a patient at the medical service provider location. Patients at the medical service provider location may typically be present for an hour for an appointment. As such, the identification station 101 may determine to store a digital representation of the biometric for the person for a time window of one hour. Alternatively, the identity information for the person may indicate that the person is a staff member at the medical service provider location. Staff members at the medical service provider location may typically be present for 8 hours for a shift. As such, the identification station 101 may determine to store a digital representation of the biometric for the person for a time window of 8 hours. Thus, different time windows may be used for different people.

However, it is understood that this is an example and that in other examples the identity information may be used to determine one or more time windows in a variety of different ways. Various configurations are possible and contemplated without departing from the scope of the present disclosure.

By way of a second example, the identification station 101 may be a security kiosk at an airport. People may generally move around a particular airport within the course of a single day. As such, based on the context of the identification station 101, the identification station 101 may determine that the time window for storing digital representations of biometrics is 24 hours. By way of contrast, the identification station 101 may be a kiosk for checking people in for medical appointments that typically last no more than three hours. As such, based on the context of the identification station 101, the identification station 101 may determine that the time window for storing digital representations of biometrics is 3 hours. Various configurations are possible and contemplated without departing from the scope of the present disclosure.

By way of a third example, the identification station 101 may be identifying people for the purpose of determining whether or not the people are known. As such, based on the context of identifying the person, the identification station 101 may determine that the time window for storing digital representations of biometrics is 24 hours because the person is not going to become unknown shortly thereafter. By way of contrast, the identification station 101 may be identifying people for the purpose of determining access permissions for a person. As such, based on the context of identifying the person, the identification station 101 may determine that the time window for storing digital representations of biometrics is 15 minutes because access permissions may be updated on a frequent basis. Various configurations are possible and contemplated without departing from the scope of the present disclosure.

By way of a fourth example, the identification station 101 may identify people as part of checking the people in for appointments. After identifying the people, the identification station 101 may access one or more schedule entries associated with the person (which may be stored by the identification station 101, by the identification system device 102, in the identity information, in another device communicably connected to the identification station 101 or the identification system device 102, and so on) and set the time window according to the schedule entry. By way of illustration, the identification station 101 may determine that the time window is two hours when the person has an appointment that is scheduled to last two hours. Various configurations are possible and contemplated without departing from the scope of the present disclosure.

By way of a fifth example, the identification station 101 may determine and/or define a time window of ten minutes when there is a large amount of network bandwidth and/or identification system device 102 load available and a time window of one hour when there is a small amount of network bandwidth and/or identification system device 102 load available. This may balance identifications using the most updated information at the identification system device 102 with availability of the identification system device 102 for performing such identifications. Various configurations are possible and contemplated without departing from the scope of the present disclosure.

In still other implementations, the identification station 101 may receive an indication of the time window from the identification system device 102 as part of communicating with the identification system device 102 and/or from one or more other devices. In such implementations, the identification system device 102 may determine the time window. The identification system device 102 may determine the time window using identity information for the person 104, a context of the identification station 101, a context of identifying the person 104, a schedule entry associated with the person 104, availability of the identification system device 102, and so on. Various configurations are possible and contemplated without departing from the scope of the present disclosure.

In various implementations, the identification station 101 may remove the digital representation of the biometric and/or other associated information from the data in the local cache after the time window. In other implementations, the identification station 101 may not remove the digital representation of the biometric and/or other associated information from the data in the local cache after the time window. Instead, the digital representation of the biometric and/or other associated information may be stored in the local cache until overwritten. In such an implementation, the time window may be a mechanism by which the data is prevented from being overwritten until after the time period. Such an implementation may enable data to stay in the local cache longer when the local cache is not being heavily used while simultaneously freeing up local cache space when needed. Various configurations are possible and contemplated without departing from the scope of the present disclosure.

In some implementations, the identification station 101 may store the local cache. In other implementations, the local cache may be stored by one or more devices associated with and/or communicably connected to the identification station 101. The identification station 101 may store various information other than digital representations of the biometrics in the local cache and/or in association with the local cache. Such information may include one or more indications of associated time windows, identity information (which may be obtained from the identification system device 102 as part of communicating with the identification system device 102) for the person 104, and so on. Various configurations are possible and contemplated without departing from the scope of the present disclosure.

Although the above is illustrated and described as the identification station 101 storing information for people 104 who have been identified by the identification station 101 in data in a local cache, it is understood that this is an example. In some implementations, multiple identification stations 101 may be present at a location. As such, information for people 104 who have been identified by the identification station 101 being added to data in a local cache for an identification station may also be communicated to other identification stations 101, whether directly, via the identification system device 102, and so on. Various configurations are possible and contemplated without departing from the scope of the present disclosure.

Further, although the above is illustrated and described as the identification station 101 storing information for people 104 who have been identified by the identification station 101 in data in a local cache, it is understood that this is an example. In some implementations, instead of and/or in addition to caching, the identification station 101 may track movement of people after performing identifications. The identification station 101 may use this tracked movement to determine whether or not a person has been previously identified. If the identification station 101 determines that the person has not been previously identified, the identification station 101 may communicate with the identity system device 102 to identify the person. Otherwise, if the identification station 101 determines that the person has been previously identified, the identification station 101 may omit communicating with the identity system device 102 to identify the person. Various configurations are possible and contemplated without departing from the scope of the present disclosure.

Figure 2:
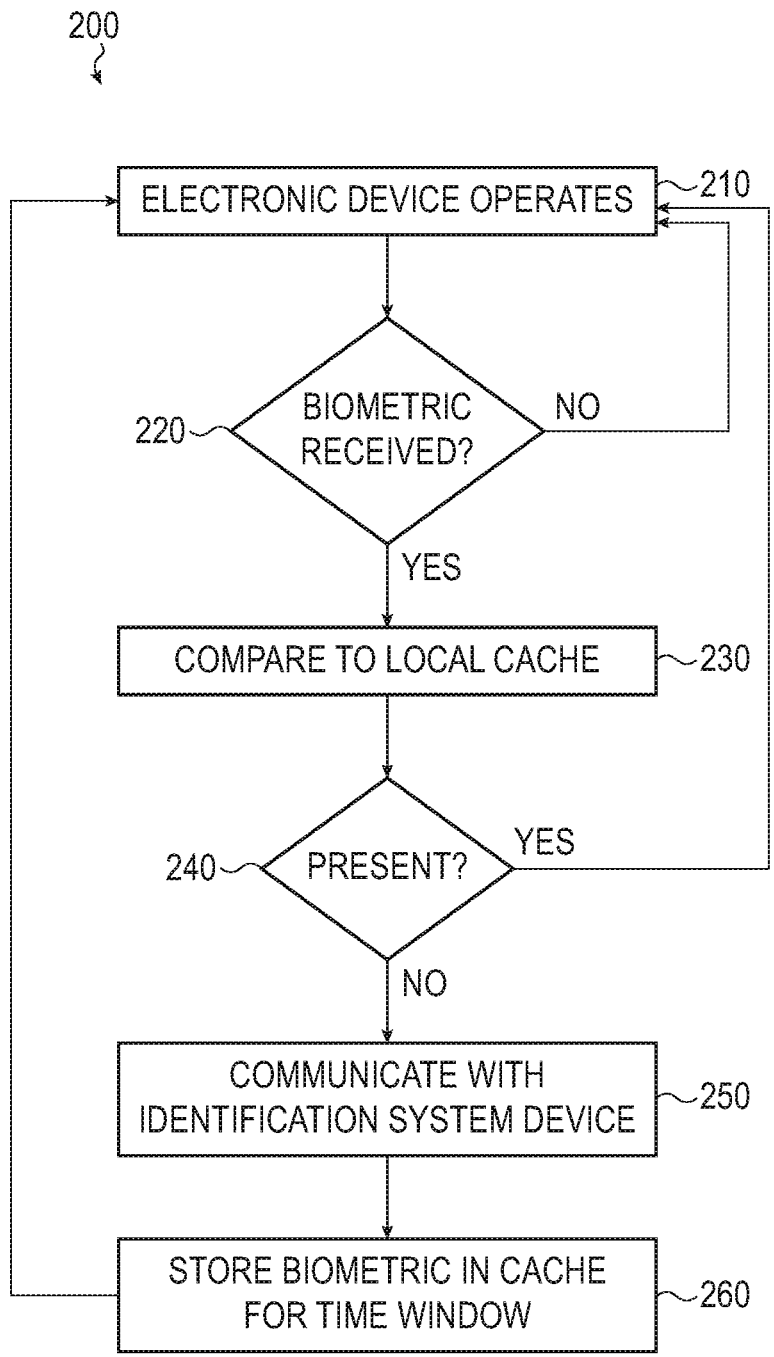
FIG. 2 is a flow chart illustrating a first example method for biometric caching. The method may be performed by the system of FIG. 1.

FIG. 2 is a flow chart illustrating a first example method 200 for biometric caching. The method 200 may be performed by the system of FIG. 1.

At operation 210, an electronic device (such as the identification station 101 of FIG. 1) may operate. At operation 220, the electronic device may determine whether one or more digital representations of one or more biometrics for one or more people may be received and/or otherwise obtained. For example, one or more biometric reader devices associated with and/or incorporated into the electronic device may capture data related to one or more biometrics (such as data related to at least a portion of a face of a person, a retina of the person, an iris of the person, a fingerprint of the person, a vein scan of the person, and so on). The data may be received (directly or indirectly) from the biometric reader device and the electronic device may generate a digital representation of the biometric (such as a hash and/or other digital representation) from the data. If not, the flow may return to operation 210 where the electronic device may continue to operate. Otherwise, the flow may proceed to operation 230.

At operation 230, the electronic device may compare the digital representation of the biometric to data in a local cache. At operation 240, the electronic device may determine whether or not the biometric is present in the data in a local cache. For example, the electronic device may determine a similarity of the digital representation of the biometric to the data in the local cache. If the digital representation of the biometric is sufficiently similar to the data in the local cache, the electronic device may determine that there is a correspondence between the digital representation of the biometric and the data in the local cache (i.e., the digital representation of the biometric is present in the data in the local cache). In other words, the electronic device may determine that there is a high likelihood that the digital representation of the biometric and the data in the local cache are for the same person. If so, the flow may return to operation 210 where the electronic device may continue to operate. Otherwise, the flow may proceed to operation 250.

At operation 250, the electronic device may communicate with the identification system device and/or otherwise use the digital representation of the biometric and the identification system device to identify the person. For example, the electronic device may transmit one or more communications to the identification system device and receive one or more responses. Transmitting the one or more communications may include selecting one or more digital representations of biometrics that have been obtained and providing them to the identification system device. Receiving the one or more responses may include detecting that one or more responses have been received, analyzing information provided in the responses, performing one or more actions using the information provided in the responses, and so on. Responses may include an indication that the person has been identified, identity information for the person (such as a name of the person, a verified age of the person, and so on), one or more attestations regarding the person (such as that the identity information for the person includes a verified age that is at least a threshold age), an identification of a time window, and so on.

At operation 260, the electronic device may store the digital representation of the biometric in the data in the local cache for a time window. This may include adding the digital representation of the biometric to a storage location of the data in the local cache, specifying the time window for storing the representation of the biometric in the storage location of the data in the local cache, storing other information (such as identity information received from the identification system device), and so on.

In various examples, this example method 200 may be implemented using a group of interrelated software modules or components that perform various functions discussed herein. These software modules or components may be executed within a cloud network and/or by one or more computing devices, such as the identification station 101 of FIG. 1.

Although the example method 200 is illustrated and described as including particular operations performed in a particular order, it is understood that this is an example. In various implementations, various orders of the same, similar, and/or different operations may be performed without departing from the scope of the present disclosure.

For example, the method 200 is illustrated and described as comparing received digital representations of biometrics to the cache prior to communicating with the identification system device to identify the person. However, in some cases, such as where the cache is empty, the electronic device may skip comparing received digital representations of biometrics to the cache and instead immediately communicate with the identification system device to identify the person. Various configurations are possible and contemplated without departing from the scope of the present disclosure.

Figure 3:
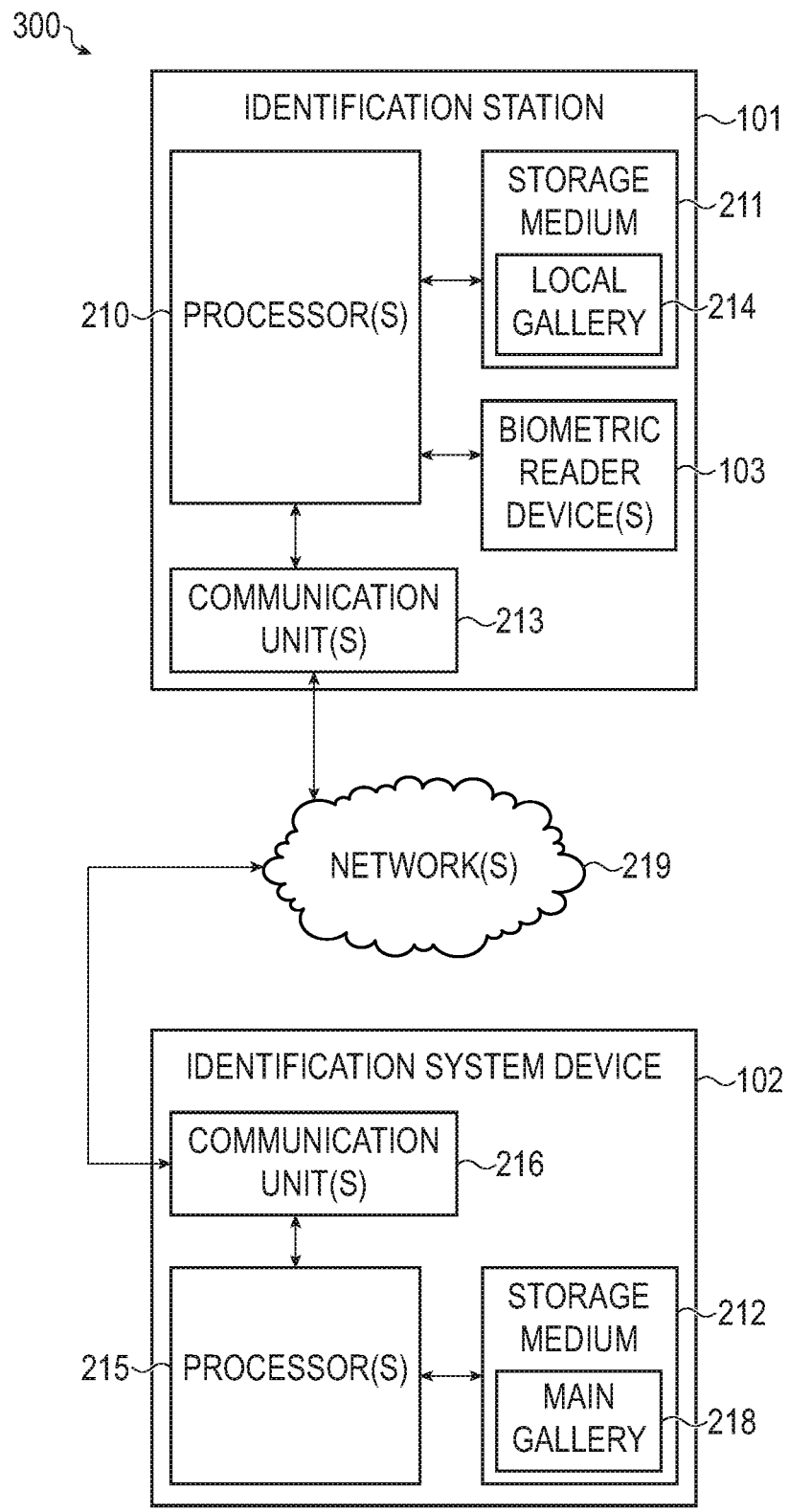
FIG. 3 depicts example relationships between example components that may be used to implement a biometric caching system, such as the system of FIG. 1.

FIG. 3 depicts example relationships 300 between example components that may be used to implement a biometric caching system, such as the system 100 of FIG. 1. This may include one or more identification stations 101 communicably coupled to one or more identification system devices 102 via one or more wired and/or wireless communication networks 219.

The identification system device 102 may store identity information (such as one or more names, addresses, telephone numbers, social security numbers, patient identification numbers or other identifiers, insurance data, financial data, health information (such as one or more temperatures, pupil dilation, medical diagnoses, immunocompromised conditions, medical histories, medical records, infection statuses, vaccinations, immunology data, results of antibody tests evidencing that a person has had a particular communicable illness and recovered, blood test results, saliva test results, and/or the like), and so on) associated with the identities of people (which may be verified identities, where the identities are verified as corresponding to the particular person named and/or where the identity information is verified as valid). Alternatively and/or additionally, some or all of the health information may be stored separately from the identity information but otherwise associated with the identity information, such as in a Health Insurance Portability and Accountability Act ("HIPAA") compliant or other data store or enclave. Such a data store or enclave may be stored on one or more different storage media than the identity information, or may be stored on the same storage medium or media and logically isolated from the identity information. The health information may be simultaneously and/or substantially simultaneously accessible as the identity information, such as where the identity information includes a health information identifier or key that may be used to access the separately stored health information. The identification system device 102 may control access to the identity information and/or the health information using identity information that is associated with the identity information. The identity information may include biometric data (which may include one or more digital representations of one or more fingerprints, blood vessel scans, palm-vein scans, voiceprints, facial images, retina images, iris images, deoxyribonucleic acid sequences, heart rhythms, gaits, and so on), one or more logins and/or passwords, authorization tokens, social media and/or other accounts, and so on. In various implementations, the identification system device 102 may allow the person associated with an identity to control access to the identity information, the health information, and/or other information (such as payment account information, health information (such as medical records, HIPAA protected information in order to be compliant with various legal restrictions, and so on), contact information, and so on. The identification system device 102 may control access to such information according to input received from the person. The identification system device 102 may be operable to communicate with the identification station 101 in order to handle requests to provide the identity information and/or the health information, update and/or otherwise add to the identity information and/or the health information, provide attestations regarding and/or related to the identity information and/or the health information (such as whether or not a person is of a particular age, whether or not a person has a particular license or insurance policy, whether or not a person has been monitored as having particular health information, whether or not a person has had a particular vaccination, whether or not an antibody test evidences that a person has had a particular communicable illness and recovered, whether or not a person has a particular ticket or authorization, whether or not a person has been monitored as having particular antibodies, whether or not a person has been assigned a particular medical diagnosis, and so on), evaluate health information stored in the identity information and/or otherwise associated with the identity information and/or other information stored in the identity information, perform transactions, allow or deny access, route one or more persons, and/or perform one or more other actions.

The identification system device 102 may be any kind of electronic device and/or cloud and/or other computing arrangement. Examples of such devices include, but are not limited to, one or more desktop computing devices, laptop computing devices, mobile computing devices, wearable devices, tablet computing devices, mobile telephones, kiosks and/or other stations, smart phones, printers, displays, vehicles, kitchen appliances, entertainment system devices, digital media players, and so on. The identification system device 102 may include one or more processors 215 and/or other processing units or controllers, communication units 216, non-transitory storage media 212, and/or other components. The processor 215 may execute one or more sets of instructions stored in the non-transitory storage media 212 to perform various functions, such as receiving and/or storing biometric data and/or other identity information, receiving and/or storing identity information and/or health information, maintaining a main biometric gallery 218 in the storage media 212, matching one or more received digital representations of biometrics and/or other identity information to stored data, retrieving identity information and/or health information associated with stored data matching one or more received digital representations of biometrics and/or other identity information, providing retrieved identity information and/or health information, determining one or more time windows, communicating with the identification station 101 via the network 219 using the communication unit 216, and so on. Alternatively and/or additionally, the identification system device 102 may involve one or more memory allocations configured to store at least one executable asset and one or more processor allocations configured to access the one or more memory allocations and execute the at least one executable asset to instantiate one or more processes and/or services, such as one or more gallery management services, biometric identifications services, and so on.

Similarly, the identification station 101 may be any kind of device. The identification station 101 may include one or more processors 210 and/or other processing units and/or controllers, one or more non-transitory storage media 211 (which may take the form of, but is not limited to, a magnetic storage medium; optical storage medium; magneto-optical storage medium; read only memory; random access memory; erasable programmable memory; flash memory; and so on), one or more communication units 213; one or more health sensors (not shown) (such as a thermometer and/or other thermal sensor, a blood pressure sensor, a blood test sensor, a blood vessel scanner, a palm-vein scanner, a still image and/or video camera, a 2D and/or 3D image sensor, a saliva sensor, a breath sensor, a deoxyribonucleic acid sensor, a heart rhythm monitor, a microphone, sweat sensors, and so on); one or more biometric reader devices 103 (such as a fingerprint scanner, a blood vessel scanner, a palm-vein scanner, an optical fingerprint scanner, a phosphorescent fingerprint scanner, a still image and/or video camera, a 2D and/or 3D image sensor, a capacitive sensor, a saliva sensor, a deoxyribonucleic acid sensor, a heart rhythm monitor, a microphone, and so on), and/or one or more other components. The processor 210 may execute one or more sets of instructions stored in the non-transitory storage media 211 to perform various functions, such as using the biometric reader 103 to obtain one or more digital representations of one or more biometrics (such as a digital representation of a fingerprint, a blood vessel scan, a palm-vein scan, a voiceprint, a facial image, a retina image, an iris image, a deoxyribonucleic acid sequence, a heart rhythm, a gait, and so on) for a person, obtain health information for a person using the health sensor, maintain a local gallery 214 in the storage media 211, communicate with the identification system device 102 via the network 219 using the communication unit 213, determine one or more time windows, and so on.

As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

Example information can include, but may not be limited to: personal identity information (e.g., names, social security numbers, telephone numbers, email addresses, physical addresses, driver's license information, passport numbers, and so on); identity documents (e.g., driver's licenses, passports, government identification cards or credentials, and so on); protected health information (e.g., medical records, dental records, and so on); financial, banking, credit, or debt information; third-party service account information (e.g., usernames, passwords, social media handles, and so on); encrypted or unencrypted files; database files; network connection logs; shell history; filesystem files; libraries, frameworks, and binaries; registry entries; settings files; executing processes; hardware vendors, versions, and/or information associated with the compromised computing resource; installed applications or services; password hashes; idle time, uptime, and/or last login time; document files; product renderings; presentation files; image files; customer information; configuration files; passwords; and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Figure 4:
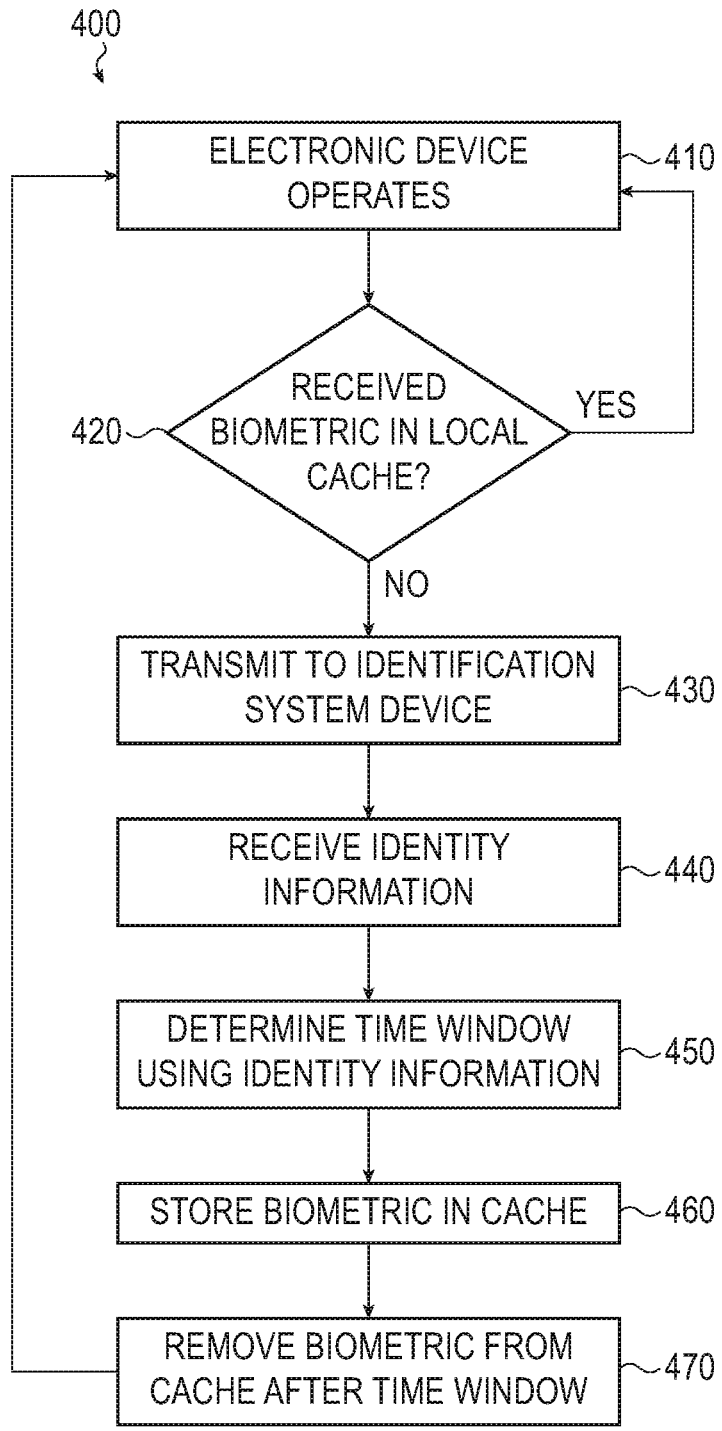
FIG. 4 is a flow chart illustrating a second example method for biometric caching. The method may be performed by the system of FIG. 1.

FIG. 4 is a flow chart illustrating a second example method 400 for biometric caching. The method 400 may be performed by the system 100 of FIG. 1.

At operation 410, an electronic device (such as the identification station 101 of FIG. 1) may operate. At operation 420, the electronic device may determine whether or not a received biometric is in a local cache. If so, the flow may return to operation 410 where the electronic device may continue to operate. Otherwise, the flow may proceed to operation 430.

At operation 430, the electronic device may transmit to an identification system device. The transmission may include the digital representation of the biometric, one or more requests and/or indications of what to do with the digital representation of the biometric (such as confirm identification, provide one or more attestations regarding identity information associated with the digital representation of the biometric, provide identity information associated with the digital representation of the biometric, and so on), and/or other information.

At operation 440, the electronic device may receive identity information. The identity information may be received from the identification system device. The identity information may be received in response to the transmission by the electronic device.

At operation 450, the electronic device may determine or define a time window using identity information. In some implementations, this may include determining whether the identity information specifies first information or second information, determining that the time window is a first time window if the identity information specifies the first information, and determining that the time window is a second time window if the identity information specifies the second information.

At operation 460, the electronic device may store the digital representation of the biometric and/or other information in the data in the local cache. At operation 470, the electronic device may remove the digital representation of the biometric and/or other information from the data in the local cache after the time window.

In various examples, this example method 400 may be implemented using a group of interrelated software modules or components that perform various functions discussed herein. These software modules or components may be executed within a cloud network and/or by one or more computing devices, such as the identification station 101 of FIG. 1.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 is illustrated and described as including operation 470. However, it is understood that this is an example. In various implementations, such an operation may be omitted. Various configurations are possible and contemplated without departing from the scope of the present disclosure.

Figure 5:
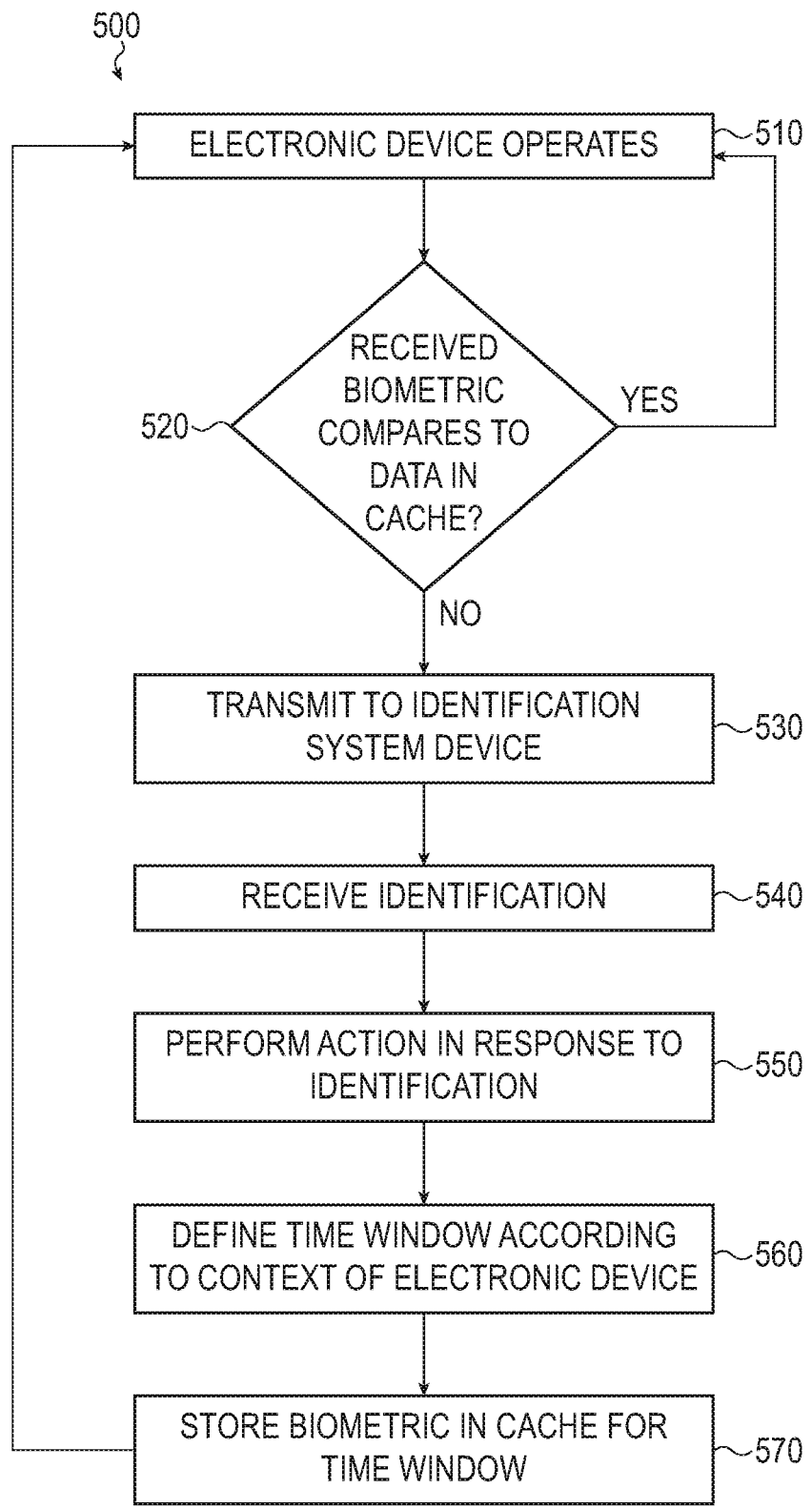
FIG. 5 is a flow chart illustrating a third example method for biometric caching. The method may be performed by the system of FIG. 1.

FIG. 5 is a flow chart illustrating a third example method 500 for biometric caching. The method 500 may be performed by the system 100 of FIG. 1. At operation 510, an electronic device (such as the identification station 101 of FIG. 1) may operate.

At operation 520, the electronic device may determine whether or not a received digital representation of a biometric compares to data in a cache. If so, the flow may return to operation 510 where the electronic device may continue to operate. Otherwise, the flow may proceed to operation 530.

At operation 530, the electronic device may transmit the digital representation of the biometric to an identification system device. At operation 540, the electronic device may receive an identification from the identification system device in response to transmitting the digital representation of the biometric.

At operation 550, the electronic device may perform an action in response to the identification. Such an action may include, but is not limited to, allowing/denying access, facilitating a payment, checking a person in for an appointment, determining whether or not the person was identified, and so on.

At operation 560, the electronic device may define a time window according to a context of the electronic device. At operation 570, the electronic device may store the digital representation of the biometric in data in the cache for the time window.

In various examples, this example method 500 may be implemented using a group of interrelated software modules or components that perform various functions discussed herein. These software modules or components may be executed within a cloud network and/or by one or more computing devices, such as the identification station 101 of FIG. 1.

Although the example method 500 is illustrated and described as including particular operations performed in a particular order, it is understood that this is an example. In various implementations, various orders of the same, similar, and/or different operations may be performed without departing from the scope of the present disclosure.

For example, operation 560 is illustrated and described as the electronic device defining the time window. However, it is understood that this is an example. In other implementations, another device (such as the identification system device) may define and/or otherwise determine the time window. Various configurations are possible and contemplated without departing from the scope of the present disclosure.

Figure 6:
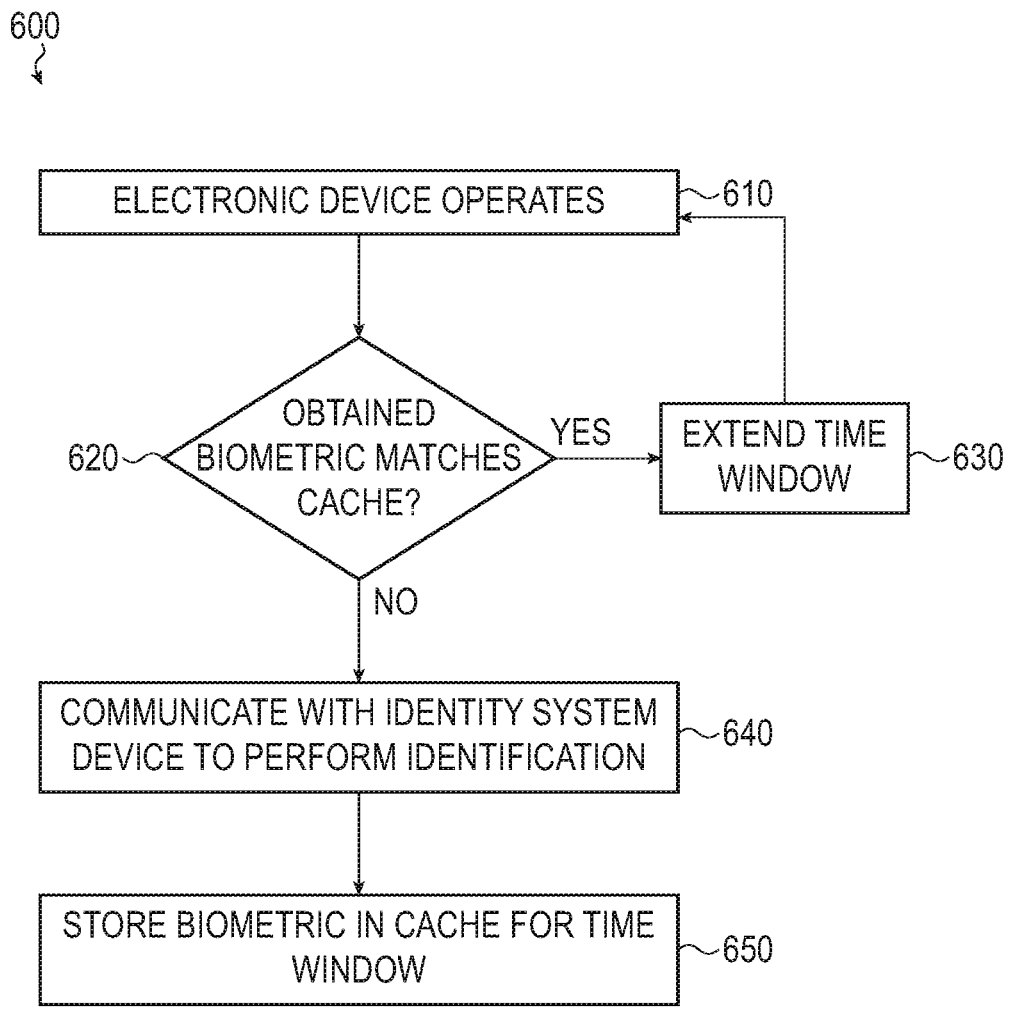
FIG. 6 is a flow chart illustrating a fourth example method for biometric caching. The method may be performed by the system of FIG. 1.

FIG. 6 is a flow chart illustrating a fourth example method 600 for biometric caching. The method 600 may be performed by the system 100 of FIG. 1. At operation 610, an electronic device (such as the identification station 101 of FIG. 1) may operate.

At operation 620, the electronic device may determine whether or not an obtained digital representation of a biometric matches data in a cache. If so, the flow may proceed to operation 630 where the electronic device may extend a time window associated with the data in the cache before the flow returns to operation 610 where the electronic device continues to operate. The extension may be the same duration as the original time window and/or may be another amount, such as the time currently remaining in the time window, a set value like ten minutes, and so on. Otherwise, the flow may proceed to operation 640.

At operation 640, the electronic device may communicate with an identification system device to perform an identification using the digital representation of the biometric. At operation 650, the electronic device may store the digital representation of the biometric in the cache for a time window.

In various examples, this example method 600 may be implemented using a group of interrelated software modules or components that perform various functions discussed herein. These software modules or components may be executed within a cloud network and/or by one or more computing devices, such as the identification station 101 of FIG. 1.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 is illustrated and described as extending the time window for data in the cache when a received biometric matches the data in the cache. However, it is understood that this is an example. In other implementations, the time window may be extended in response to the occurrence of other events, such as receipt of instructions from the identification system device. Various configurations are possible and contemplated without departing from the scope of the present disclosure.

Figure 7:
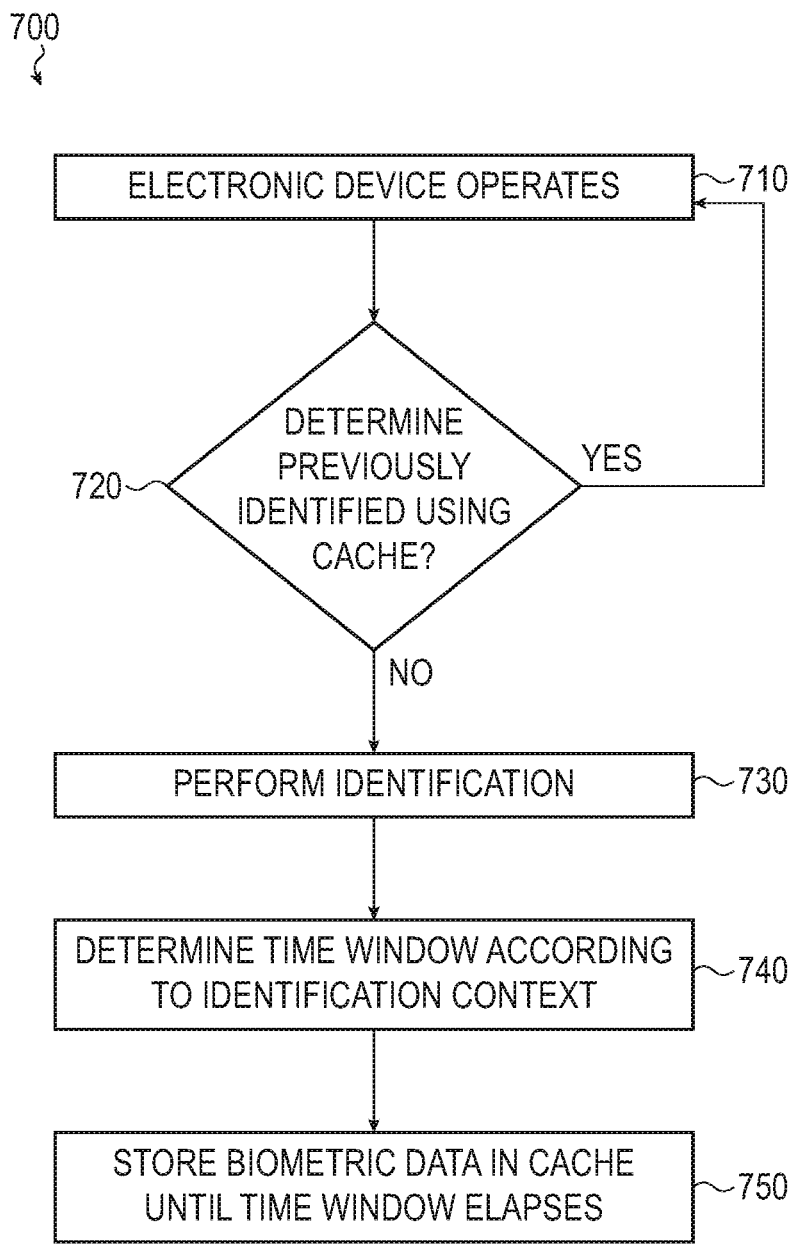
FIG. 7 is a flow chart illustrating a fifth example method for biometric caching. The method may be performed by the system of FIG. 1.

FIG. 7 is a flow chart illustrating a fifth example method 700 for biometric caching. The method 700 may be performed by the system 100 of FIG. 1.

At operation 710, an electronic device (such as the identification station 101 of FIG. 1) may operate. At operation 720, the electronic device may determine, using a cache, whether a person associated with biometric data was previously identified. If so, the flow may return to operation 710 where the electronic device may continue to operate. Otherwise, the flow may proceed to operation 730.

At operation 730, the electronic device may perform identification by communicating with an identification system device. At operation 740, the electronic device may determine a time window according to an identification context. At operation 750, the electronic device may store biometric data in cache until the time window elapses.

In various examples, this example method 700 may be implemented using a group of interrelated software modules or components that perform various functions discussed herein. These software modules or components may be executed within a cloud network and/or by one or more computing devices, such as the identification station 101 of FIG. 1.

Although the example method 700 is illustrated and described as including particular operations performed in a particular order, it is understood that this is an example. In various implementations, various orders of the same, similar, and/or different operations may be performed without departing from the scope of the present disclosure.

For example, the method 700 is illustrated and described as the electronic device storing the biometric data in the cache. However, it is understood that this is an example. In various implementations, the cache may be maintained by another device and the electronic device may instruct storage as opposed to storing the biometric data in the cache itself. Various configurations are possible and contemplated without departing from the scope of the present disclosure.

Figure 8:
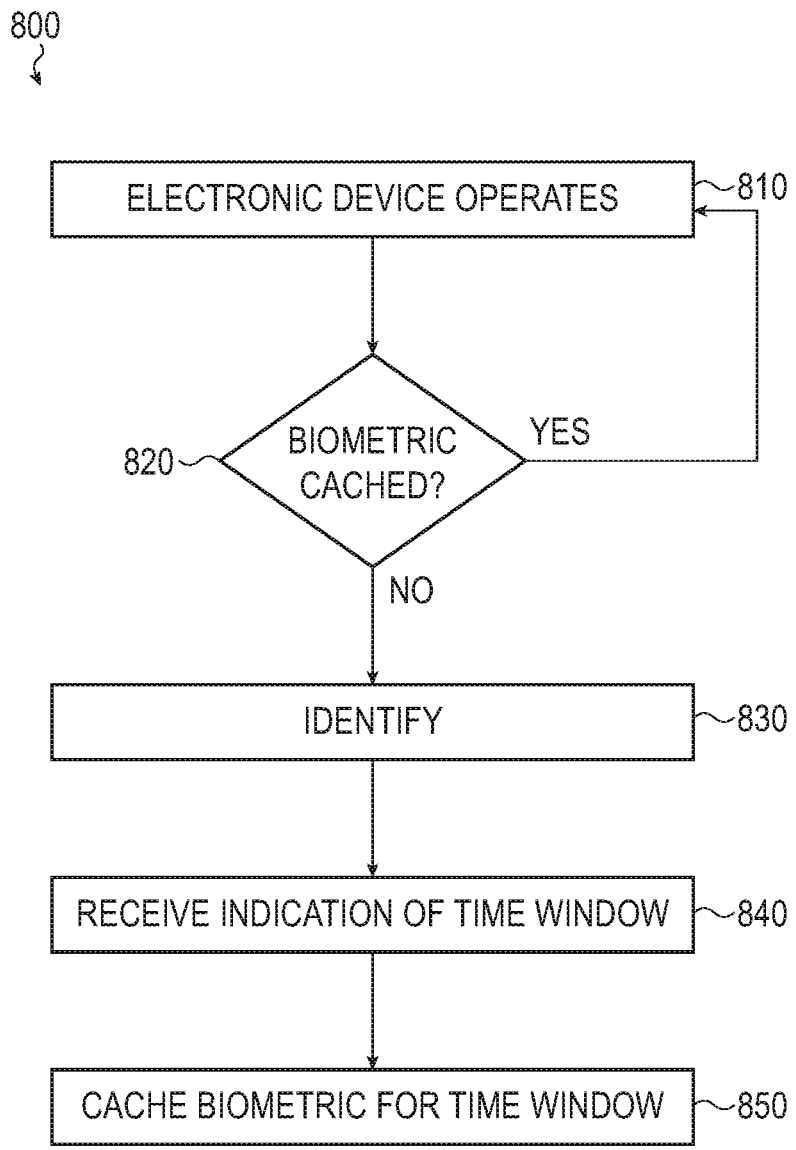
FIG. 8 is a flow chart illustrating a sixth example method for biometric caching. The method may be performed by the system of FIG. 1.

FIG. 8 is a flow chart illustrating a sixth example method 800 for biometric caching. The method 800 may be performed by the system 100 of FIG. 1.

At operation 810, an electronic device (such as the identification station 101 of FIG. 1) may operate.

At operation 820, the electronic device may determine whether or not a received digital representation of a biometric for a person is cached. If so, the flow may return to operation 810 where the electronic device may continue to operate. Otherwise, the flow may proceed to operation 830.

At operation 830, the electronic device may identify the person using the digital representation of the biometric and an identification system device. At operation 840, the electronic device may receive an indication of a time window, such as from the identification system device. At operation 850, the electronic device may cache the digital representation of the biometric for the time window.

In various examples, this example method 800 may be implemented using a group of interrelated software modules or components that perform various functions discussed herein. These software modules or components may be executed within a cloud network and/or by one or more computing devices, such as the identification station 101 of FIG. 1.

Although the example method 800 is illustrated and described as including particular operations performed in a particular order, it is understood that this is an example. In various implementations, various orders of the same, similar, and/or different operations may be performed without departing from the scope of the present disclosure.

For example, operation 820 is illustrated and described as determining whether or not a received digital representation of a biometric for a person is cached. However, it is understood that this is an example. In various implementations, the digital representation of the biometric may be obtained instead of being received. Various configurations are possible and contemplated without departing from the scope of the present disclosure.

Figure 9:
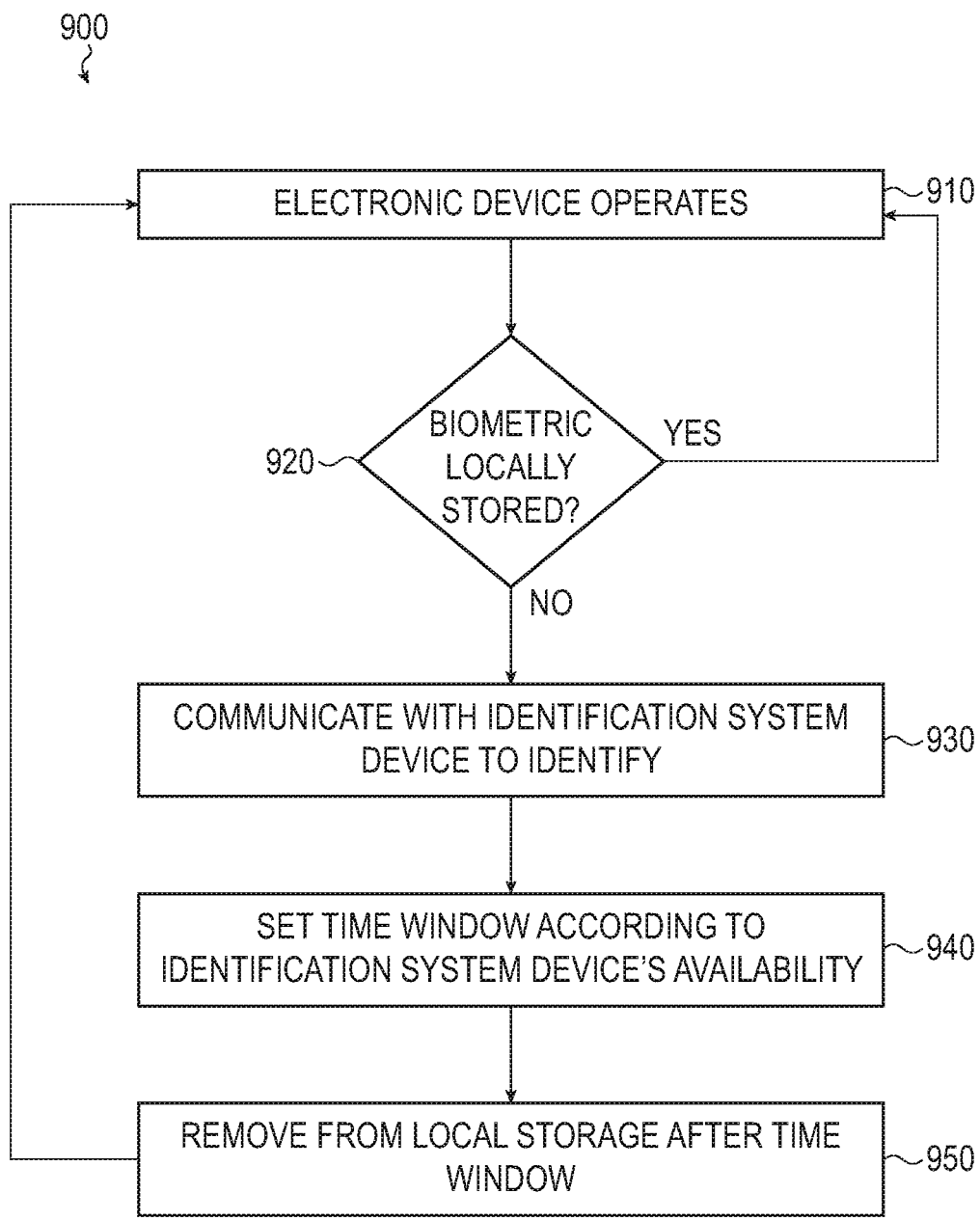
FIG. 9 is a flow chart illustrating a seventh example method for biometric caching. The method may be performed by the system of FIG. 1.

FIG. 9 is a flow chart illustrating a seventh example method 900 for biometric caching. The method 900 may be performed by the system 100 of FIG. 1.

At operation 910, an electronic device (such as the identification station 101 of FIG. 1) may operate. At operation 920, the electronic device may determine whether or not a digital representation of a biometric is locally stored. If so, the flow may return to operation 910 where the electronic device may continue to operate. Otherwise, the flow may proceed to operation 930.

At operation 930, the electronic device may communicate with an identification system device to identify a person associated with the digital representation of the biometric. At operation 940, the electronic device may set a time window for storing the digital representation of the biometric locally according to the identification system device's availability. The electronic device may determine the identification system device's availability based on communicating with the identification system device. At operation 950, the electronic device may remove the digital representation of the biometric from local storage after the time window.

In various examples, this example method 900 may be implemented using a group of interrelated software modules or components that perform various functions discussed herein. These software modules or components may be executed within a cloud network and/or by one or more computing devices, such as the identification station 101 of FIG. 1.

Although the example method 900 is illustrated and described as including particular operations performed in a particular order, it is understood that this is an example. In various implementations, various orders of the same, similar, and/or different operations may be performed without departing from the scope of the present disclosure.

For example, the method 900 may include one or more additional operations in some implementations. One such additional operation may be an operation where the electronic device receives an indication of the identification system device's availability. Various configurations are possible and contemplated without departing from the scope of the present disclosure.

Figure 10:
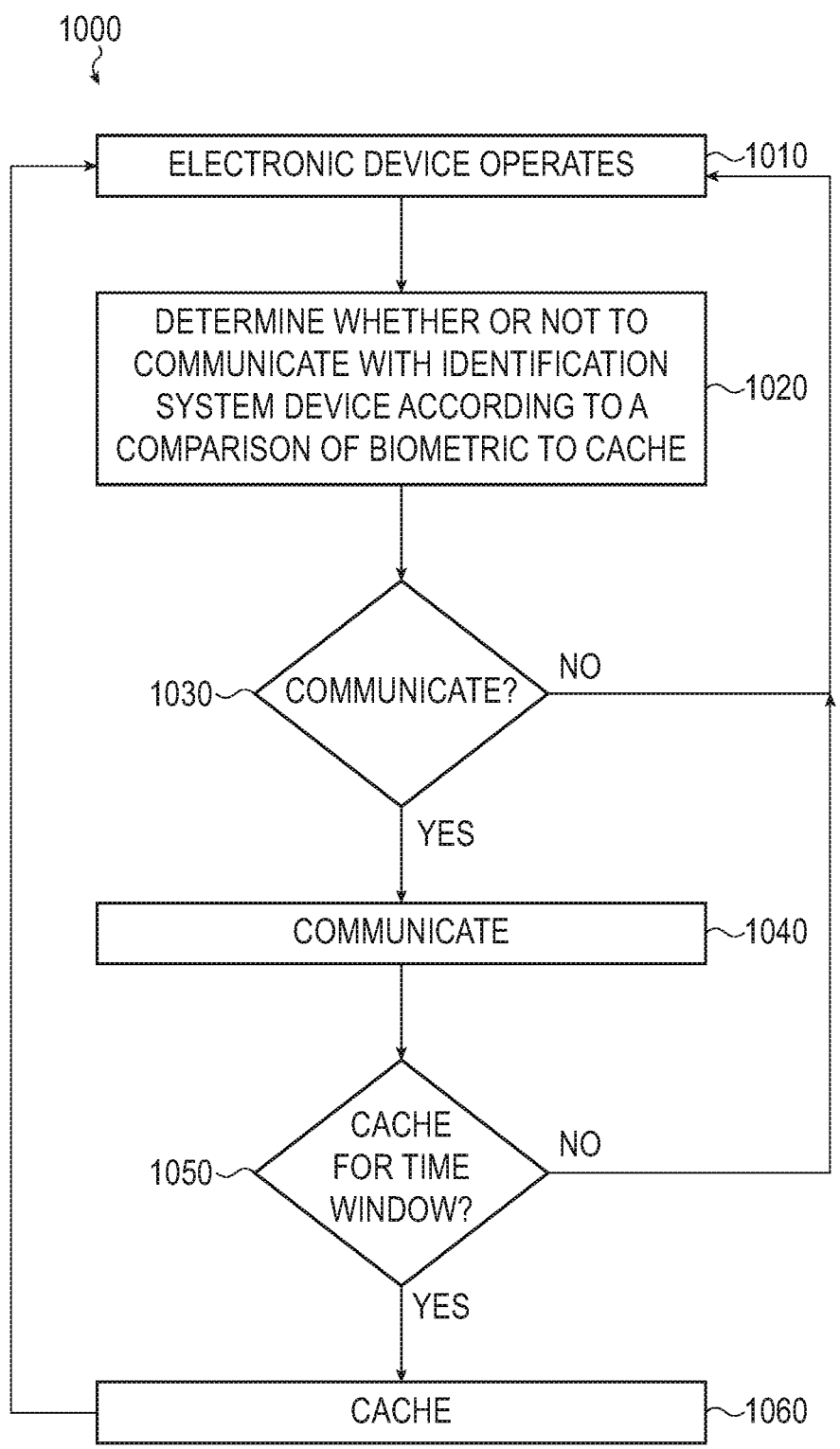
FIG. 10 is a flow chart illustrating an eighth example method for biometric caching. The method may be performed by the system of FIG. 1.

FIG. 10 is a flow chart illustrating an eighth example method 1000 for biometric caching. The method 1000 may be performed by the system 100 of FIG. 1.

At operation 1010, an electronic device (such as the identification station 101 of FIG. 1) may operate. At operation 1020, the electronic device may determine whether or not to communicate with an identification system device according to a comparison of a digital representation of a biometric to a cache.

At operation 1030, the electronic device determines whether the result of the determination in operation 1020 was to communicate with the identification system device. If not, the flow may return to operation 1010 where the electronic device may continue to operate. Otherwise, the flow may proceed to operation 1040. At operation 1040, the electronic device communicates with the identification system device.

At operation 1050, the electronic device determines whether or to not to cache the digital representation of the biometric for a time window. The electronic device may determine whether or not to cache the digital representation of the biometric based on a number of factors. For example, the electronic device may receive an indication from the identification system device that specifies whether or not to cache the digital representation of the biometric. Alternatively and/or additionally, the electronic device may determine whether or not to cache the digital representation of the biometric for the time window using identity information associated with the digital representation of the biometric, based on a context of the electronic device, based on a context of an identification performed by the electronic device and/or the identification system device, and so on.

For example, the electronic device may be operable to identify people for entrance to an airport lounge. A first set of people may be associated with a first status level where they obtain access to the airport lounge each day. A second set of people may be associated with a second status level where they obtain access to the airport lounge for a year. In this example, the electronic device may determine not to cache the digital representation of the biometric when the status level is the first status level and to cache the digital representation of the biometric when the status level is the second status level. In this way, the electronic device may not verify entitlement for the second status level as often since it changes less frequently.

If not, the flow may return to operation 1010 where the electronic device may continue to operate. Otherwise, the flow may proceed to operation 1060 where the electronic device may cache the digital representation of the biometric for the time window.

In various examples, this example method 1000 may be implemented using a group of interrelated software modules or components that perform various functions discussed herein. These software modules or components may be executed within a cloud network and/or by one or more computing devices, such as the identification station 101 of FIG. 1.

Although the example method 1000 is illustrated and described as including particular operations performed in a particular order, it is understood that this is an example. In various implementations, various orders of the same, similar, and/or different operations may be performed without departing from the scope of the present disclosure.

For example, operation 1050 is illustrated and described as determining whether or not to cache the digital representation of the biometric. However, it is understood that this is an example. In other implementations, the electronic device may determine whether to cache the digital representation of the biometric for a first time window or a second time window as opposed to determining whether or not to cache the digital representation of the biometric. Various configurations are possible and contemplated without departing from the scope of the present disclosure.

In various implementations, an identification station that performs biometric caching may include a non-transitory storage medium storing instructions and a processor. The processor may execute the instructions to obtain a digital representation of a biometric for a person, compare the digital representation of the biometric to data in a local cache, and, in response to determining that the digital representation of the biometric does not correspond to the data in the local cache, communicate the digital representation of the biometric to an identification system device to identify the person, the identification system device storing biometric data and associated identity information for multiple people, and store the digital representation of the biometric in the data in the local cache for a time window.

In some examples, the processor may remove the digital representation of the biometric from the data in the local cache after the time window. In a number of examples, the identification station may further include a biometric reader device that passively captures the digital representation of the biometric. In various examples, the biometric may include at least a portion of a face. In some examples, the processor may omit identifying the person in response to determining that the digital representation of the biometric corresponds to the data in the local cache. In some examples, the processor may store respective identity information associated with the person in association with the digital representation of the biometric in the data in the local cache. In a number of examples, the processor may store an indication of the time window in association with the digital representation of the biometric in the data in the local cache.

In some implementations, an identification station that performs biometric caching may include a non-transitory storage medium storing instructions and a processor. The processor may execute the instructions to obtain a digital representation of a biometric for a person and, in response to determining that the digital representation of the biometric does not correspond to data in a local cache, use the digital representation of the biometric and an identification system device that stores biometric data and associated identity information for multiple people to identify the person, determine a time window, and store the digital representation of the biometric in the data in the local cache for the time window.

In various examples, the digital representation of the biometric may be a first digital representation of the biometric and the processor may extend the time window in response to determining that a second digital representation of the biometric is received that corresponds to the first digital representation of the biometric and the data in the local cache. In some examples, the identification station may determine the time window according to an availability of the identification system device. In a number of examples, the processor may determine the time window using respective identity information associated with the person. In various examples, the processor may determine the time window according to a context of the identification station. In a number of examples, the processor may determine the time window according to a context of identifying the person. In some examples, the processor may determine the time window based on a schedule entry associated with the person.

In a number of implementations, a system for biometric caching may include an identification system device and an identification station. The identification station may obtain a digital representation of a biometric for a person and, in response to determining that the digital representation of the biometric does not correspond to data in a local cache, transmit the digital representation of the biometric to the identification system device that stores biometric data and associated identity information for multiple people, receive an identification from the identification system device, receives an indication of a time window from the identification system device, and store the digital representation of the biometric in the data in the local cache for the time window.

In various examples, the identification system device may determine the time window using respective identity information associated with the person. In some examples, the identification system device may determine the time window according to a context of the identification station. In a number of examples, the identification system device may determine the time window according to a context of the identification. In some examples, the identification system device may determine the time window is a first time window when the person is a first person and a second time window when the person is a second person. In various examples, the local cache may indefinitely store digital representations of biometrics for a set of people.

Although the above illustrates and describes a number of embodiments, it is understood that these are examples. In various implementations, various techniques of individual embodiments may be combined without departing from the scope of the present disclosure.

As described above and illustrated in the accompanying figures, the present disclosure relates to a biometric caching system. An identification station stores data related to previous biometric identifications in a local cache for one or more time windows. Upon obtaining a digital representation of a biometric, the identification station may first check if the digital representation of the biometric corresponds to data in the local cache. If so, the identification station may omit communicating with the identification system device. Otherwise, the identification station may communicate with the identification system device to identify the person, as well as store the digital representation of the biometric in the local cache for the one or more time windows.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An identification station that performs biometric caching, comprising: a non-transitory storage medium storing instructions; and a processor that executes the instructions to: obtain a digital representation of a biometric for a person; compare the digital representation of the biometric to data in a local cache; in response to determining that the digital representation of the biometric does not correspond to the data in the local cache, store the digital representation of the biometric in the data in the local cache for a time window; perform an identification by communicating the digital representation of the biometric that is stored in the data in the local cache to an identification system device to identify the person, the identification system device storing biometric data and associated identity information for multiple people; and performing a determination of whether to allow the person access; and in response to determining that the digital representation of the biometric does correspond to the data in the local cache, omit repeating the determination of whether to allow the person access.

2. The identification station of claim 1, wherein the processor removes the digital representation of the biometric from the data in the local cache after the time window.

3. The identification station of claim 1, further comprising a biometric reader device that passively captures the digital representation of the biometric.

4. The identification station of claim 1, wherein the biometric comprises at least a portion of a face.

5. The identification station of claim 1, wherein identifying the person further includes obtaining identity information for the person that is associated with the digital representation of the biometric.

6. The identification station of claim 5, wherein the identity information for the person that is associated with the digital representation of the biometric is obtained from the identification system device.

7. The identification station of claim 1, wherein the processor stores an indication of the time window in association with the digital representation of the biometric in the data in the local cache.

8. An identification station that performs biometric caching, comprising: a non-transitory storage medium storing instructions; and a processor that executes the instructions to: obtain a digital representation of a biometric for a person; in response to determining that the digital representation of the biometric does not correspond to the data in the local cache: determine a time window; store the digital representation of the biometric in the data in the local cache for the time window; use the digital representation of the biometric that is stored in the data in the local cache and an identification system device that stores biometric data and associated identity information for multiple people to perform an identification of identify the person; and perform a processing of a payment; in response to determining that the digital representation of the biometric does correspond to the data in the local cache, omit repeating the processing of the payment.

9. The identification station of claim 8, wherein:
the digital representation of the biometric is a first digital representation of the biometric; and
the processor extends the time window in response to determining that a second digital representation of the biometric is received that corresponds to the first digital representation of the biometric and the data in the local cache.

10. The identification station of claim 8, wherein the identification station determines the time window according to an availability of the identification system device.

11. The identification station of claim 8, wherein the processor determines the time window using respective identity information associated with the person.

12. The identification station of claim 8, wherein the processor determines the time window according to a context of the identification station.

13. The identification station of claim 8, wherein the processor determines the time window according to a context of identifying the person.

14. The identification station of claim 8, wherein the processor determines the time window based on a schedule entry associated with the person.

15. A system for biometric caching, comprising: an identification system computer device; and an identification station that: obtains a digital representation of a biometric for a person; in response to determining that the digital representation of the biometric does not correspond to the data in a local cache: stores the digital representation of the biometric in the data in the local cache; transmits the digital representation of the biometric stored in the data in the local cache to the identification system device that stores biometric data and associated identity information for multiple people; receives an identification from the identification system device; receives an indication of a time window from the identification system device wherein the time window is how long the identification station will store the digital representation of the biometric in the data in the local cache; and perform a check-in of the person for an appointment; and in response to determining that the digital representation of the biometric does correspond to the data in the local cache, omit repeating the check-in of the person in for the appointment.

16. The system of claim 15, wherein the identification system computer device determines the time window using respective identity information associated with the person.

17. The system of claim 15, wherein the identification system computer device determines the time window according to a context of the identification station.

18. The system of claim 15, wherein the identification system computer device determines the time window according to a context of the identification.

19. The system of claim 15, wherein the identification system computer device determines the time window is: a first time window when the person is a first person; and a second time window when the person is a second person.

20. The system of claim 15, wherein the local cache indefinitely stores digital representations of biometrics for a set of people.

* * * * *